United States Patent
Ward et al.

(10) Patent No.: US 10,316,981 B2
(45) Date of Patent: Jun. 11, 2019

(54) HEAT PUMP WATER HEATER APPLIANCE AND AN ELECTRONIC MIXING VALVE

(71) Applicant: General Electric Company, Schenectady, NY (US)

(72) Inventors: Shaun Michael Ward, Louisville, KY (US); Timothy Scott Shaffer, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 563 days.

(21) Appl. No.: 14/721,113

(22) Filed: May 26, 2015

(65) Prior Publication Data

US 2016/0348952 A1   Dec. 1, 2016

(51) Int. Cl.

| | |
|---|---|
| *G05D 23/19* | (2006.01) |
| *F16K 31/04* | (2006.01) |
| *F16K 11/02* | (2006.01) |
| *F16K 11/00* | (2006.01) |
| *G05D 23/13* | (2006.01) |
| *F24H 4/04* | (2006.01) |
| *F24H 9/12* | (2006.01) |
| *F25B 30/02* | (2006.01) |

(52) U.S. Cl.
CPC .............. *F16K 31/04* (2013.01); *F16K 11/02* (2013.01); *F16K 19/00* (2013.01); *F24H 4/04* (2013.01); *F24H 9/124* (2013.01); *G05D 23/1393* (2013.01); *F25B 30/02* (2013.01); *F25B 2339/047* (2013.01); *F25B 2400/071* (2013.01)

(58) Field of Classification Search
None
See application file for complete search history.

(56) References Cited

U.S. PATENT DOCUMENTS

| | | | | |
|---|---|---|---|---|
| 5,803,354 | A * | 9/1998 | Benedict | G05D 23/134 |
| | | | | 236/101 D |
| 6,286,464 | B1 * | 9/2001 | Abraham | G05D 23/134 |
| | | | | 122/14.31 |
| 6,315,209 | B1 * | 11/2001 | Tripp | G05D 23/1346 |
| | | | | 236/12.13 |
| 6,460,567 | B1 * | 10/2002 | Hansen, III | F16K 31/04 |
| | | | | 137/554 |
| 8,733,666 | B2 * | 5/2014 | Beagen | G05D 23/1346 |
| | | | | 236/12.1 |
| 2003/0178498 | A1 * | 9/2003 | Saitoh | F24D 17/02 |
| | | | | 237/2 B |
| 2010/0123014 | A1 * | 5/2010 | Beagen | G05D 23/1346 |
| | | | | 236/12.2 |
| 2010/0263754 | A1 | 10/2010 | Gordon et al. | |

(Continued)

*Primary Examiner* — Jonathan Bradford
(74) *Attorney, Agent, or Firm* — Dority & Manning, P.A.

(57) ABSTRACT

A heat pump water heater appliance includes an electronic mixing valve. The electronic mixing valve is positioned within a casing of the heat pump water heater appliance. A mixed water conduit and a heated water conduit of the electronic mixing valve may be positioned coaxially with each other, and a cold water conduit of the electronic mixing valve may be oriented such that the cold water conduit extends orthogonal to the heated water conduit and the mixed water conduit. A plunger is positioned within the valve body at the mixing chamber of the valve body. A motor is coupled to the plunger, the motor being operable to adjust a position of a head of the plunger within the valve body.

18 Claims, 6 Drawing Sheets

(56) References Cited

U.S. PATENT DOCUMENTS

2012/0037095 A1   2/2012  DuPlessis
2012/0060521 A1*  3/2012  Roetker .................. F24H 4/04
                                                        62/79

* cited by examiner

HEAT PUMP WATER HEATER APPLIANCE AND AN ELECTRONIC MIXING VALVE

FIELD OF THE INVENTION

The present subject matter relates generally to heat pump water heaters and mixing valves for water heaters.

BACKGROUND OF THE INVENTION

Certain water heater appliances include a tank therein. Heating elements, such as gas burners, electric resistance elements, or sealed systems, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. Accordingly, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks. However, mixing valves can be large and occupy a large volume over or within the water heater appliance.

Accordingly, a water heater appliance having a mixing valve that includes features for reducing space occupied by the mixing valve would be useful. In particular, a water heater appliance having a mixing valve that includes features for reducing space occupied by the mixing valve within the water heater appliance would be useful.

BRIEF DESCRIPTION OF THE INVENTION

The present subject matter provides a heat pump water heater appliance. The heat pump water heater appliance includes an electronic mixing valve that is positioned within a casing of the heat pump water heater appliance. A mixed water conduit and a heated water conduit of the electronic mixing valve may be positioned coaxially with each other, and a cold water conduit of the electronic mixing valve may be oriented such that the cold water conduit extends orthogonal to the heated water conduit and the mixed water conduit. Additional aspects and advantages of the invention will be set forth in part in the following description, or may be apparent from the description, or may be learned through practice of the invention.

In a first exemplary embodiment, a heat pump water heater appliance is provided. The heat pump water heater appliance includes a casing and a tank disposed within the casing. The tank defines an inlet and an outlet. An inlet conduit is mounted to the tank at the inlet of the tank. A bypass conduit is coupled to the inlet conduit. A sealed system is configured for heating water within the tank. The sealed system has a condenser, a compressor and an evaporator. The condenser is positioned at the tank. The compressor is operable to provide compressed refrigerant to the condenser, and the evaporator is configured for receiving refrigerant from the condenser. An electronic mixing valve is positioned within the casing at the outlet of the tank. The electronic mixing valve includes a valve body that defines a heated water conduit, a cold water conduit, a mixed water conduit and a mixing chamber. The valve body is coupled to the tank such that the heated water conduit is positioned for receiving heated water from the outlet of the tank. The bypass conduit is coupled to the valve body at the cold water conduit of the valve body. The heated water conduit and the mixed water conduit are positioned coaxially with each other. A plunger is positioned within the valve body at the mixing chamber of the valve body. The plunger has a head. A motor is coupled to the plunger. The motor is operable to adjust a position of the head of the plunger within the valve body.

In a second exemplary embodiment, a heat pump water heater appliance is provided. The heat pump water heater appliance includes a casing and a tank disposed within the casing. The tank defines an inlet and an outlet. An inlet conduit is mounted to the tank at the inlet of the tank. A bypass conduit is coupled to the inlet conduit. A sealed system is configured for heating water within the tank. The sealed system has a condenser, a compressor and an evaporator. The condenser is positioned at the tank. The compressor is operable to provide compressed refrigerant to the condenser, and the evaporator is configured for receiving refrigerant from the condenser. An electronic mixing valve is positioned within the casing at the outlet of the tank. The electronic mixing valve includes a valve body having a heated water conduit, a cold water conduit, a mixed water conduit and a mixing chamber. The heated water conduit is coupled to the tank at the outlet of the tank. The bypass conduit is coupled to the cold water conduit. The mixed water conduit is positioned above the heated water conduit. The cold water conduit is oriented such that the cold water conduit extends orthogonal to the heated water conduit and the mixed water conduit. A plunger is positioned within the valve body at the mixing chamber of the valve body. The plunger has a head. A motor is coupled to the plunger. The motor is operable to adjust a position of the head of the plunger within the valve body.

In a third exemplary embodiment, an electronic mixing valve for a water heater appliance is provided. The electronic mixing valve includes a valve body that defines a heated water conduit, a cold water conduit, a mixed water conduit and a mixing chamber. The heated water conduit and the mixed water conduit are positioned coaxially with each other. The cold water conduit is oriented such that the cold water conduit extends orthogonal to the heated water conduit and the mixed water conduit. The heated water conduit, the cold water conduit and the mixed water conduit of the valve body are integrally formed with one another. A plunger is positioned within the valve body at the mixing chamber of the valve body. The plunger having a head. A motor is coupled to the plunger. The motor is operable to adjust a position of the head of the plunger within the valve body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
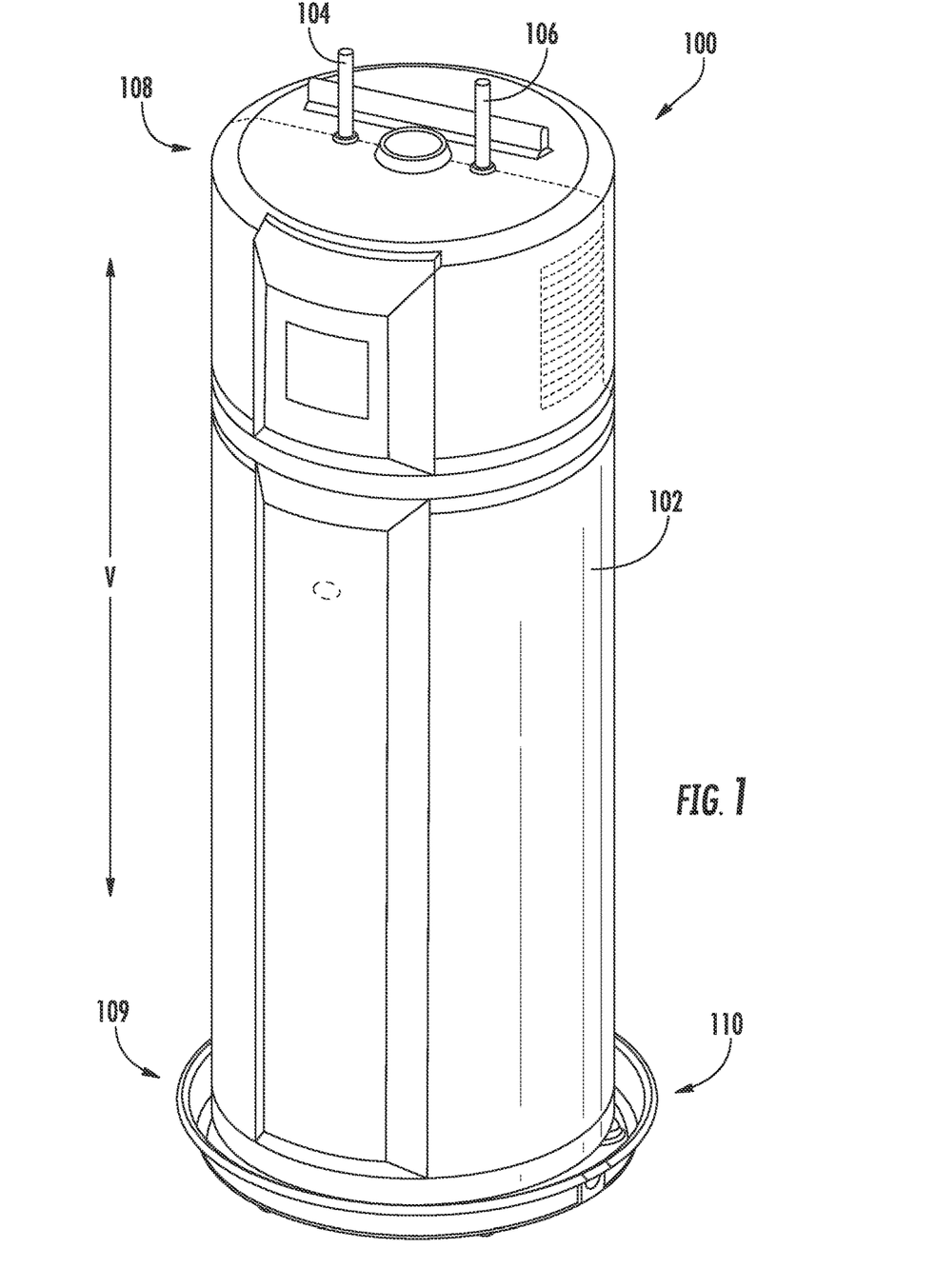
FIG. 1 provides a perspective view of a water heater appliance according to an exemplary embodiment of the present subject matter.
Figure 2:
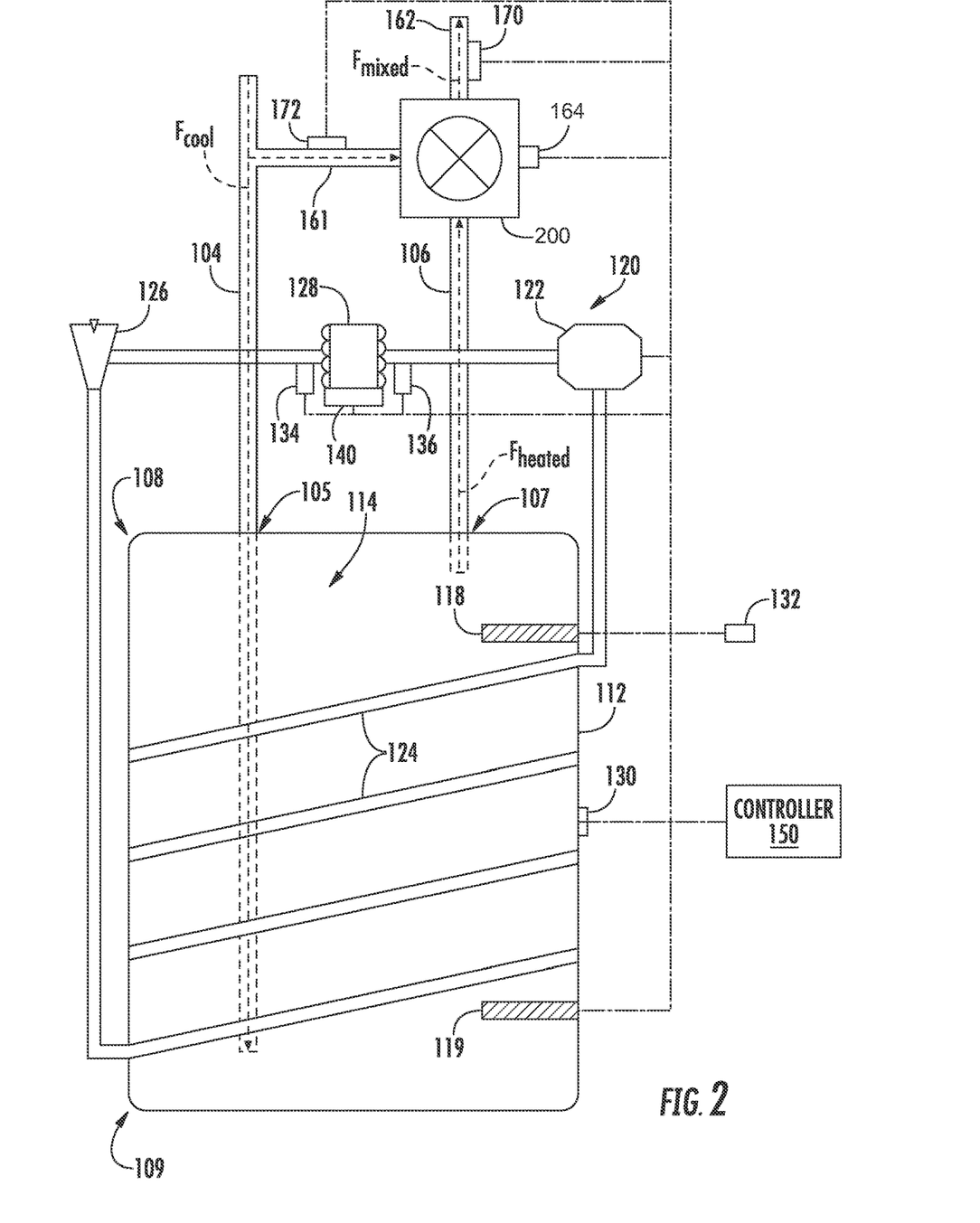
FIG. 2 provides a schematic view of certain components of the exemplary water heater appliance of FIG. 1.

FIG. 1 provides a perspective view of a water heater appliance 100 according to an exemplary embodiment of the present subject matter. FIG. 2 provides a schematic view of certain components of water heater appliance 100. As may be seen in FIGS. 1 and 2, water heater appliance 100 includes a casing 102 and a tank 112 mounted within casing 102. Tank 112 defines an interior volume 114 for heating water therein.

Water heater appliance 100 also includes an inlet conduit 104 and an outlet conduit 106 that are both in fluid communication with tank 112 within casing 102. As an example, cold water from a water source, e.g., a municipal water supply or a well, enters water heater appliance 100 through inlet conduit 104. From inlet conduit 104, such cold water enters interior volume 114 of tank 112 wherein the water is heated to generate heated water. Such heated water exits water heater appliance 100 at outlet conduit 106 and, e.g., is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 of water heater appliance 100. It should be understood that water heater appliance 100 is provided by way of example only and that the present subject matter may be used with any suitable water heater appliance.

Turning now to FIG. 2, water heater appliance 100 includes an upper heating element 118, a lower heating element 119 and a sealed system 120 for heating water within interior volume 114 of tank 112. Thus, water heater appliance 100 is commonly referred to as a "heat pump water heater appliance." Upper and lower heating elements 118 and 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner.

Sealed system 120 includes a compressor 122, a condenser 124, a throttling device 126 and an evaporator 128. Condenser 124 is thermally coupled or assembled in a heat exchange relationship with tank 112 in order to heat water within interior volume 114 of tank 112 during operation of sealed system 120. In particular, condenser 124 may be a conduit coiled around and mounted to tank 112. During operation of sealed system 120, refrigerant exits evaporator 128 as a fluid in the form of a superheated vapor and/or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid and/or high quality liquid vapor mixture. This high quality/saturated liquid vapor mixture exits condenser 124 and travels through throttling device 126 that is configured for regulating a flow rate of refrigerant therethrough. Upon exiting throttling device 126, the pressure and temperature of the refrigerant drop at which time the refrigerant enters evaporator 128 and the cycle repeats itself. In certain exemplary embodiments, throttling device 126 may be an electronic expansion valve (EEV).

A fan or air handler 140 may assist with heat transfer between air about water heater appliance 100, e.g., within casing 102, and refrigerant within evaporator 128. Air handler 140 may be positioned within casing 102 on or adjacent evaporator 128. Thus, when activated, air handler 140 may direct a flow of air towards or across evaporator 128, and the flow of air from air handler 140 may assist with heating refrigerant within evaporator 128. Air handler 140 may be any suitable type of air handler, such as an axial or centrifugal fan.

Water heater appliance 100 also includes a tank temperature sensor 130. Tank temperature sensor 130 is configured for measuring a temperature of water within interior volume 114 of tank 112. Tank temperature sensor 130 can be positioned at any suitable location within or on water heater appliance 100. For example, tank temperature sensor 130 may be positioned within interior volume 114 of tank 112 or may be mounted to tank 112 outside of interior volume 114 of tank 112. When mounted to tank 112 outside of interior volume 114 of tank 112, tank temperature sensor 130 can be configured for indirectly measuring the temperature of water within interior volume 114 of tank 112. For example, tank temperature sensor 130 can measure the temperature of tank 112 and correlate the temperature of tank 112 to the temperature of water within interior volume 114 of tank 112. Tank temperature sensor 130 may also be positioned at or adjacent top portion 108 of water heater appliance 100, e.g., at or adjacent an inlet of outlet conduit 106.

Tank temperature sensor 130 can be any suitable temperature sensor. For example, tank temperature sensor 130 may be a thermocouple or a thermistor. As may be seen in FIG. 2, tank temperature sensor 130 may be the only temperature sensor positioned at or on tank 112 that is configured for measuring the temperature of water within interior volume 114 of tank 112 in certain exemplary embodiments. In alternative exemplary embodiments, additional temperature sensors may be positioned at or on tank 112 to assist tank temperature sensor 130 with measuring the temperature of water within interior volume 114 of tank 112, e.g., at other locations within interior volume 114 of tank 112.

Water heater appliance 100 also includes an ambient temperature sensor 132, an evaporator inlet temperature sensor 134 and an evaporator outlet temperature sensor 136. Ambient temperature sensor 132 is configured for measuring a temperature of air about water heater appliance 100. Ambient temperature sensor 132 can be positioned at any suitable location within or on water heater appliance 100. For example, ambient temperature sensor 132 may be mounted to casing 102, e.g., at or adjacent top portion 108 of water heater appliance 100. Ambient temperature sensor 132 can be any suitable temperature sensor. For example, ambient temperature sensor 132 may be a thermocouple or a thermistor.

Evaporator inlet temperature sensor 134 is configured for measuring a temperature of refrigerant at or adjacent inlet of evaporator 128. Thus, evaporator inlet temperature sensor 134 may be positioned at or adjacent inlet of evaporator 128, as shown in FIG. 2. For example, evaporator inlet temperature sensor 134 may be mounted to tubing that directs refrigerant into evaporator 128, e.g., at or adjacent inlet of evaporator 128. When mounted to tubing, evaporator inlet temperature sensor 134 can be configured for indirectly measuring the temperature of refrigerant at inlet of evaporator 128. For example, evaporator inlet temperature sensor 134 can measure the temperature of the tubing and correlate the temperature of the tubing to the temperature of refrigerant at inlet of evaporator 128. Evaporator inlet temperature sensor 134 can be any suitable temperature sensor. For example, evaporator inlet temperature sensor 134 may be a thermocouple or a thermistor.

Evaporator outlet temperature sensor 136 is configured for measuring a temperature of refrigerant at or adjacent outlet of evaporator 128. Thus, evaporator outlet temperature sensor 136 may be positioned at or adjacent outlet of evaporator 128, as shown in FIG. 2. For example, evaporator outlet temperature sensor 136 may be mounted to tubing that directs refrigerant out of evaporator 128, e.g., at or adjacent outlet of evaporator 128. When mounted to tubing, evaporator outlet temperature sensor 136 can be configured for indirectly measuring the temperature of refrigerant at outlet of evaporator 128. For example, evaporator outlet temperature sensor 136 can measure the temperature of the tubing and correlate the temperature of the tubing to the temperature of refrigerant at outlet of evaporator 128. Evaporator outlet temperature sensor 136 can be any suitable temperature sensor. For example, evaporator outlet temperature sensor 136 may be a thermocouple or a thermistor.

Water heater appliance 100 further includes a controller 150 that is configured for regulating operation of water heater appliance 100. Controller 150 is in, e.g., operative, communication with upper heating element 118, lower heating element 119, compressor 122, tank temperature sensor 130, ambient temperature sensor 132, evaporator inlet temperature sensor 134, evaporator outlet temperature sensor 136, and air handler 140. Thus, controller 150 may selectively activate upper and lower heating elements 118 and 119 and/or compressor 122 in order to heat water within interior volume 114 of tank 112, e.g., in response to signals from tank temperature sensor 130, ambient temperature sensor 132, evaporator inlet temperature sensor 134 and/or evaporator outlet temperature sensor 136.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may operate upper heating element 118, lower heating element 119 and/or compressor 122 in order to heat water within interior volume 114 of tank 112. As an example, a user may select or establish a set temperature, $t_s$, for water within interior volume 114 of tank 112, or the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119 and/or compressor 122 in order to heat water within interior volume 114 of tank 112 to the set temperature $t_s$ for water within interior volume 114 of tank 112. The set temperature $t_s$ for water within interior volume 114 of tank 112 may be any suitable temperature. For example, the set temperature $t_s$ for water within interior volume 114 of tank 112 may be between about one hundred degrees Fahrenheit and about one hundred and eighty-degrees Fahrenheit. As used herein with regards to temperature approximations, the term "about" means within ten degrees of the stated temperature.

As may be seen in FIG. 2, water heater appliance 100 also includes a mixing valve 200 and a mixed water outlet conduit 162. Mixing valve 200 is in fluid communication with inlet conduit 104 via a bypass conduit 161, outlet conduit 106, and mixed water outlet conduit 162. As discussed in greater detail below, mixing valve 200 is configured for selectively directing water from inlet conduit 104 and outlet conduit 106 into mixed water outlet conduit 162 in order to regulate a temperature of water within mixed water outlet conduit 162. Mixing valve 200 may be positioned or disposed within casing 102 of water heater appliance 100, e.g., such that mixing valve 200 is integrated within water heater appliance 100.

As an example, mixing valve 200 can selectively adjust between a first position and a second position. In the first position, mixing valve 200 can permit a first flow rate of relatively cool water from inlet conduit 104 (shown schematically with arrow labeled $F_{cool}$ in FIG. 2) into mixed water outlet conduit 162 and mixing valve 200 can also permit a first flow rate of relatively hot water from outlet conduit 106 (shown schematically with arrow labeled $F_{heated}$ in FIG. 2) into mixed water outlet conduit 162. In such a manner, water within mixed water outlet conduit 162 (shown schematically with arrow labeled $F_{mixed}$ in FIG. 2) can have a first particular temperature when mixing valve 200 is in the first position. Similarly, mixing valve 200 can permit a second flow rate of relatively cool water from inlet conduit 104 into mixed water outlet conduit 162 and mixing valve 200 can also permit a second flow rate of relatively hot water from outlet conduit 106 into mixed water outlet conduit 162 in the second position. The first and second flow rates of the relatively cool water and relatively hot water are different such that water within mixed water outlet conduit 162 can have a second particular temperature when mixing valve 200 is in the second position. In such a manner, mixing valve 200 can regulate the temperature of water within mixed water outlet conduit 162 and adjust the temperature of water within mixed water outlet conduit 162 between the first and second particular temperatures.

It should be understood that, in certain exemplary embodiments, mixing valve 200 is adjustable between more positions than the first and second positions. In particular, mixing valve 200 may be adjustable between any suitable number of positions in alternative exemplary embodiments. For example, mixing valve 200 may be infinitely adjustable in order to permit fine-tuning of the temperature of water within mixed water outlet conduit 162.

Water heater appliance 100 also includes a position sensor 164. Position sensor 164 is configured for determining a position of mixing valve 200. Position sensor 164 can monitor the position of mixing valve 200 in order to assist with regulating the temperature of water within mixed water outlet conduit 162. For example, position sensor 164 can determine when mixing valve 200 is in the first position or the second position in order to ensure that mixing valve 200 is properly or suitably positioned depending upon the temperature of water within mixed water outlet conduit 162 desired or selected. Thus, position sensor 164 can provide feedback regarding the status or position of mixing valve 200.

Position sensor 164 may be any suitable type of sensor. For example, position sensor 164 may be a physical sensor, such as an optical sensor, Hall-effect sensor, etc. In alternative exemplary embodiments, water heater appliance 100 need not include position sensor 164, and controller 150 may determine or measure a motor position of mixing valve 200 based on a previously commanded position of mixing valve 200. Thus, controller 150 may determine that the current position of mixing valve 200 corresponds to a latest position that controller 150 commanded for mixing valve 200 in a previous iteration.

Water heater appliance 100 also includes a mixed water conduit temperature sensor or first temperature sensor 170 and an inlet conduit temperature sensor or second temperature sensor 172. First temperature sensor 170 is positioned on or proximate mixed water outlet conduit 162 and is configured for measuring a temperature of water within mixed water outlet conduit 162. First temperature sensor 170 is also positioned downstream of mixing valve 200. Second temperature sensor 172 is positioned on or proximate inlet conduit 104 or bypass conduit 161 and is configured for measuring a temperature of water within inlet conduit 104 or bypass conduit 161. Second temperature sensor 172 is positioned upstream of mixing valve 200. In certain exemplary embodiments, first temperature sensor 170 and/or second temperature sensor 172 may be positioned proximate or adjacent mixing valve 200. First and second temperature sensors 170, 172 may be any suitable type of temperature sensors, such as a thermistor or thermocouple.

Controller 150 can also operate mixing valve 200 to regulate the temperature of water within mixed water outlet conduit 162. For example, controller 150 can adjust the position of mixing valve 200 in order to regulate the temperature of water within mixed water outlet conduit 162. As an example, a user can select or establish a set-point temperature of mixing valve 200, or the set-point temperature of mixing valve 200 may be a default value. Based upon the set-point temperature of mixing valve 200, controller 150 can adjust the position of mixing valve 200 in order to change or tweak a ratio of relatively cool water flowing into mixed water outlet conduit 162 from inlet conduit 104 and relatively hot water flowing into mixed water outlet conduit 162 from outlet conduit 106. In such a manner, controller 150 can regulate the temperature of water within mixed water outlet conduit 162.

The set-point temperature of mixing valve 200 can be any suitable temperature. For example, the set-point temperature of mixing valve 200 may be between about one hundred degrees Fahrenheit and about one hundred and twenty degrees Fahrenheit. In particular, the set-point temperature of mixing valve 200 may be selected such that the set-point temperature of mixing valve 200 is less than the set-point temperature for water within interior volume 114 of tank 112. In such a manner, mixing valve 200 can utilize water from inlet conduit 104 and outlet conduit 106 to regulate the temperature of water within mixed water outlet conduit 162.

Figure 3:
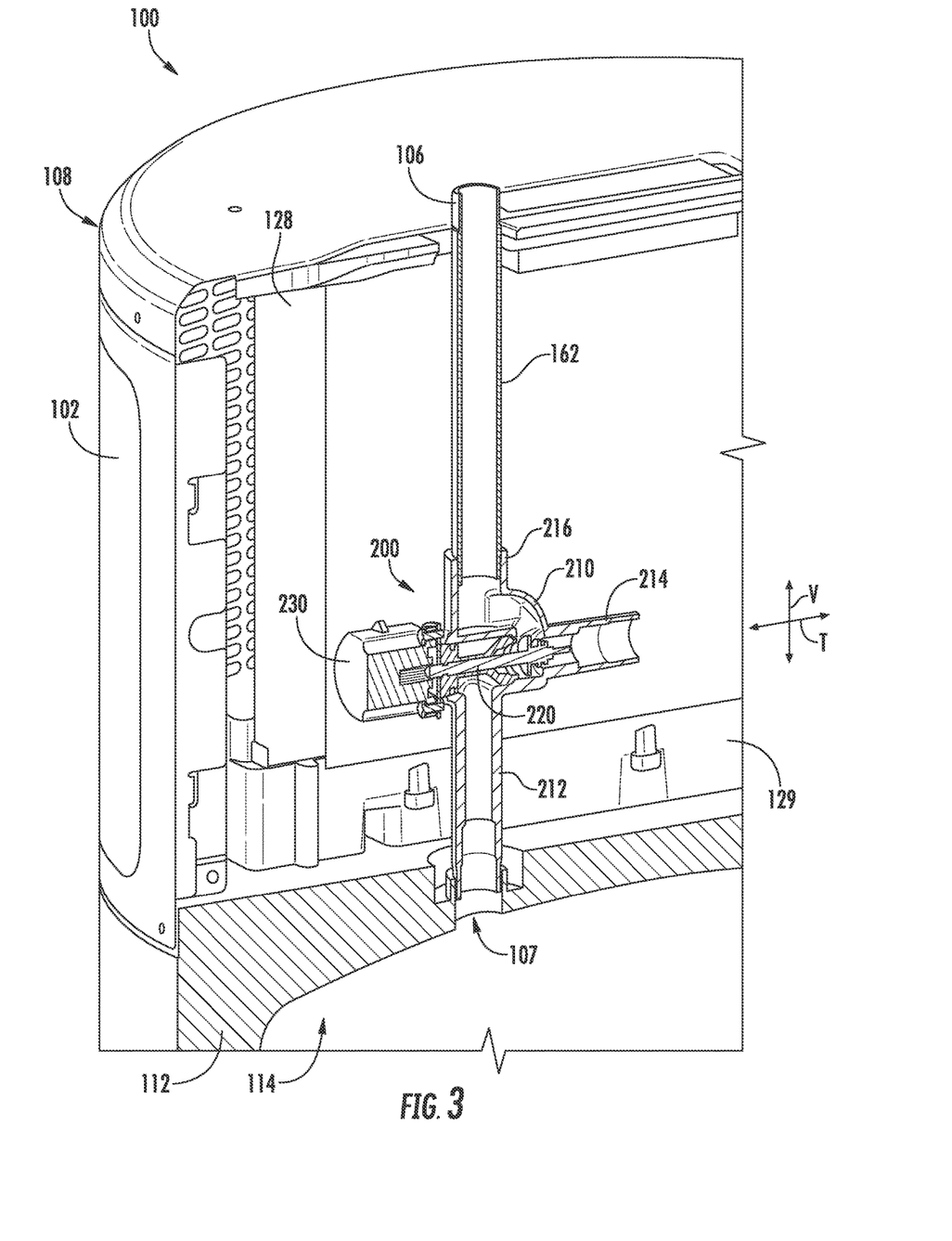
FIG. 3 provides a partial, section view of the exemplary water heater appliance of FIG. 1.
Figure 4:
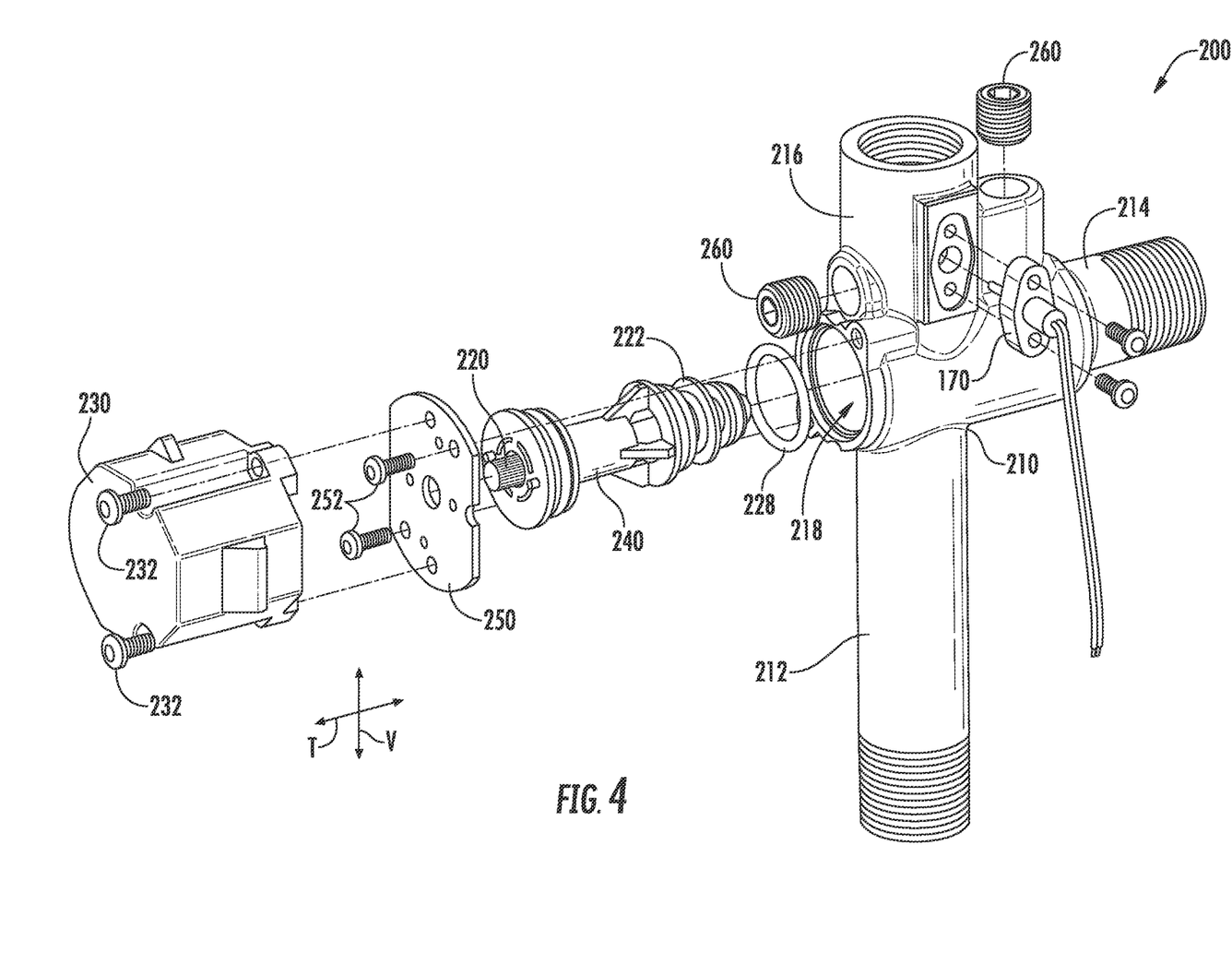
FIG. 4 provides an exploded view of a mixing valve of the exemplary water heater appliance of FIG. 1.

FIG. 3 provides a partial, section view of water heater appliance 100 at top portion 108 of water heater appliance 100. FIG. 4 provides an exploded view of mixing valve 200 of water heater appliance 100. It should be understood that, while described in greater detail below in the context of water heater appliance 100, mixing valve 200 may be used in or with any other suitable water heater appliance in alternative exemplary embodiments.

As may be seen in FIGS. 3 and 4, mixing valve 200 includes a valve body 210. Valve body 210 has a heated water conduit 212, a cold water conduit 214, a mixed water conduit 216 and a mixing chamber 218. As may be seen in FIG. 3, heated water conduit 212 of valve body 210 is coupled to tank 112 at an outlet 107 of tank 112. As an example, heated water conduit 212 of valve body 210 may be threaded to tank 112 at outlet 107 of tank 112 such that heated water conduit 212 of valve body 210 forms at least a portion of outlet conduit 106. Bypass conduit 161 is coupled to cold water conduit 214 of valve body 210. Accordingly, heated water from interior volume 114 of tank 112 may flow into mixing chamber 218 of valve body 210 via heated water conduit 212 of valve body 210, and cold water from inlet conduit 104 may flow into mixing chamber 218 of valve body 210 via cold water conduit 214 of valve body 210.

Heated water conduit 212 of valve body 210 may be positioned, e.g., directly, below mixed water conduit 216 of valve body 210 within casing 102 of water heater appliance 100. For example, heated water conduit 212 and mixed water conduit 216 of valve body 210 may be positioned coaxially with each other, and heated water conduit 212 and mixed water conduit 216 of valve body 210 may both extend vertically within casing 102 of water heater appliance 100. In addition, cold water conduit 214 of valve body 210 may be oriented such that cold water conduit 214 extends orthogonal to heated water conduit 212 and mixed water conduit 216 of valve body 210. Such arrangement of heated water conduit 212, cold water conduit 214 and mixed water conduit 216 of valve body 210 may assist with preserving valuable volume within casing 102 of water heater appliance 100. In particular, such arrangement of heated water conduit 212, cold water conduit 214 and mixed water conduit 216 of valve body 210 may assist with limiting an area occupied by mixing valve 200, e.g., in a plane that is perpendicular to the vertical direction V, while allowing easy access to mixing valve 200 within casing 102.

Valve body 210 may be formed such that heated water conduit 212, cold water conduit 214 and mixed water conduit 216 of valve body 210 are integrally formed with one another. Thus, e.g., valve body 210 may be cast from a suitable metal, such as steel, aluminum, bronze, etc. Valve body 210 may also be formed of any other suitable rigid and/or ductile material, such as a plastic, a composite, etc., that is suitable for shipping and installing water heater appliance 100 without fracturing valve body 210.

Figure 5:
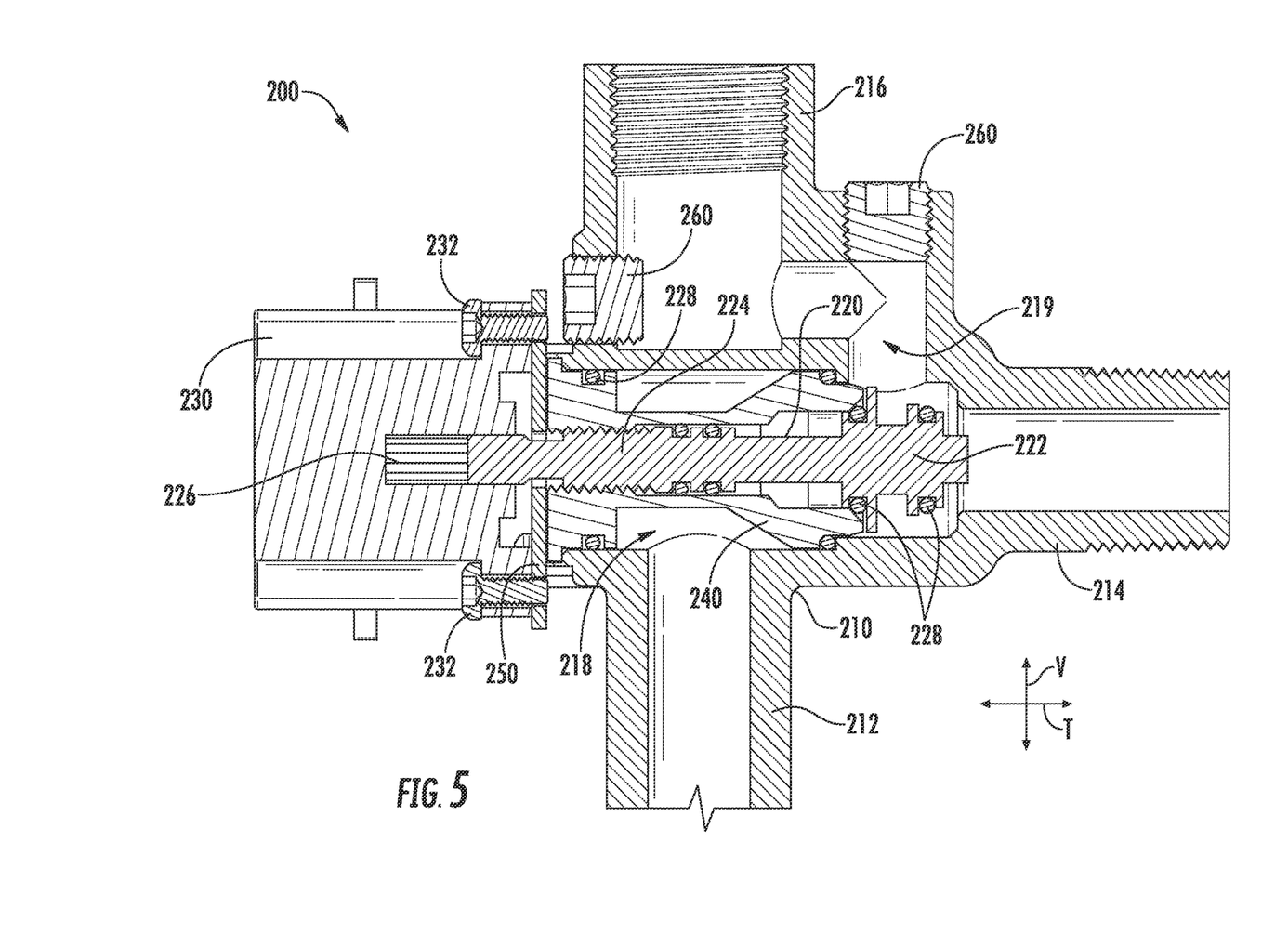
FIG. 5 provides a partial, section view of the mixing valve of FIG. 4 with a plunger of the mixing valve in a fully open position.

As may be seen in FIG. 5, valve body 210 also defines a supply conduit 219 that extends between mixing chamber 218 and mixed water conduit 216 of valve body 210. Thus, supply conduit 219 of valve body 210 directs water from mixing chamber 218 to mixed water conduit 216 of valve body 210. Supply conduit 219 of valve body 210 may formed such that supply conduit 219 turns or redirects water within valve body 210, e.g., by about ninety degrees between mixing chamber 218 and mixed water conduit 216 of valve body 210. As used herein with regards to angle approximations, the term "about" means within ten degrees of the stated angle. Supply conduit 219 of valve body 210 may also be integrally formed with mixed water conduit 216 of valve body 210.

Mixing valve 200 also includes a plunger 220 and a support bracket 240. Plunger 220 is positioned within valve body 210 at mixing chamber 218 of valve body 210. Plunger 220 has a head 222. Head 222 of plunger 220 assist with regulating water flow into mixing chamber 218 of valve body 210, as discussed in greater detail below. Support bracket 240 is also positioned within valve body 210 at mixing chamber 218 of valve body 210. Support bracket 240 engages plunger 220 within valve body 210 in order to support plunger 220 within valve body 210. For example, a post 224 of plunger 220 may be threaded to support bracket 240, e.g., within mixing chamber 218 of valve body 210.

Turning to FIG. 4, mixing valve 200 includes a mounting plate 250. Mounting plate 250 is coupled to valve body 210. Any suitable method or mechanism may be used to couple mounting plate 250 to valve body 210. For example, plate fasteners 252 may extend through mounting plate 250 into valve body 210 in order to couple mounting plate 250 to valve body 210. Mounting plate 250 contacts support bracket 240 such that mounting plate 250 retains or holds support bracket 240 within mixing chamber 218 of valve body 210.

Mixing valve 200 further includes a motor 230, such as a stepper motor. Thus, mixing valve 200 is generally referred to as an "electronic mixing valve." Motor 230 is coupled to plunger 220, and motor 230 is operable to adjust a position of the head 222 of plunger 220 within valve body 210. For example, motor 230 may engage splines 226 formed on an end of plunger 220 opposite the head 222 of plunger 220, and motor 230 may rotate plunger 220 relative to support bracket 240 such that the threaded connection between post 224 of plunger 220 and support bracket 240 moves the head 222 of plunger 220 within mixing chamber 218 of valve body 210.

As may be seen in FIGS. 3 and 4, mixed water conduit 216 of valve body 210 may be oriented such that liquid within mixed water conduit 216 flows along the vertical direction V. Conversely, motor 230 may be configured for moving plunger 220 along a transverse direction T that is, e.g., substantially, perpendicular to the vertical direction. As used herein the phrase "substantially perpendicular" means within ten degrees of perpendicular.

Motor 230 may be positioned on mounting plate 250, e.g., on a side of valve body 210 positioned opposite cold water conduit 214 of valve body 210. Any suitable method or mechanism may be used to couple motor 230 to mounting plate 250. For example, motor fasteners 232 may extend through motor 230 into mounting bracket 250 in order to couple motor 230 to mounting plate 250. Such arrangement of motor 230 on valve body 210 may assist with accessing motor 230 within casing 102 of water heater appliance 100. For example, a service technician or owner of water heater appliance 100 may remove motor 230 from valve body 210, e.g., by removing motor fasteners 232, without having to remove valve body 210 from casing 102 of water heater appliance 100 or having to remove mounting plate 250 from valve body 210 and thereby unsealing valve body 210.

As may be seen in FIG. 3, mixing valve 200 may be positioned within casing 102 at or adjacent top portion 108 of water heater appliance 100. In particular, mixing valve 200 may be positioned within casing 102 above tank 112 and, e.g., in a vertical plane between evaporator 128 and compressor 122 of sealed system 120. As discussed in greater detail below, mixing valve 200 may be arranged such that mixing valve 200 does not significantly hinder or obstruct operation of sealed system 120. For example, heated water conduit 212 of valve body 210 may be dimensioned such that valve body 210 is positioned at a bottom portion of evaporator 128 and out of the airflow path into evaporator 128 and such that cold water conduit 214 does not impact a drain pan 129 of evaporator 128 below evaporator 128. Cold water conduit 214 may also be oriented such that cold water conduit 214 extends towards inlet conduit 104 within casing 102. Such orientation of cold water conduit 214 may permit large angular misalignment of mixing valve 200 relative to inlet conduit 104 during assembly of water heater appliance 100.

Figure 6:
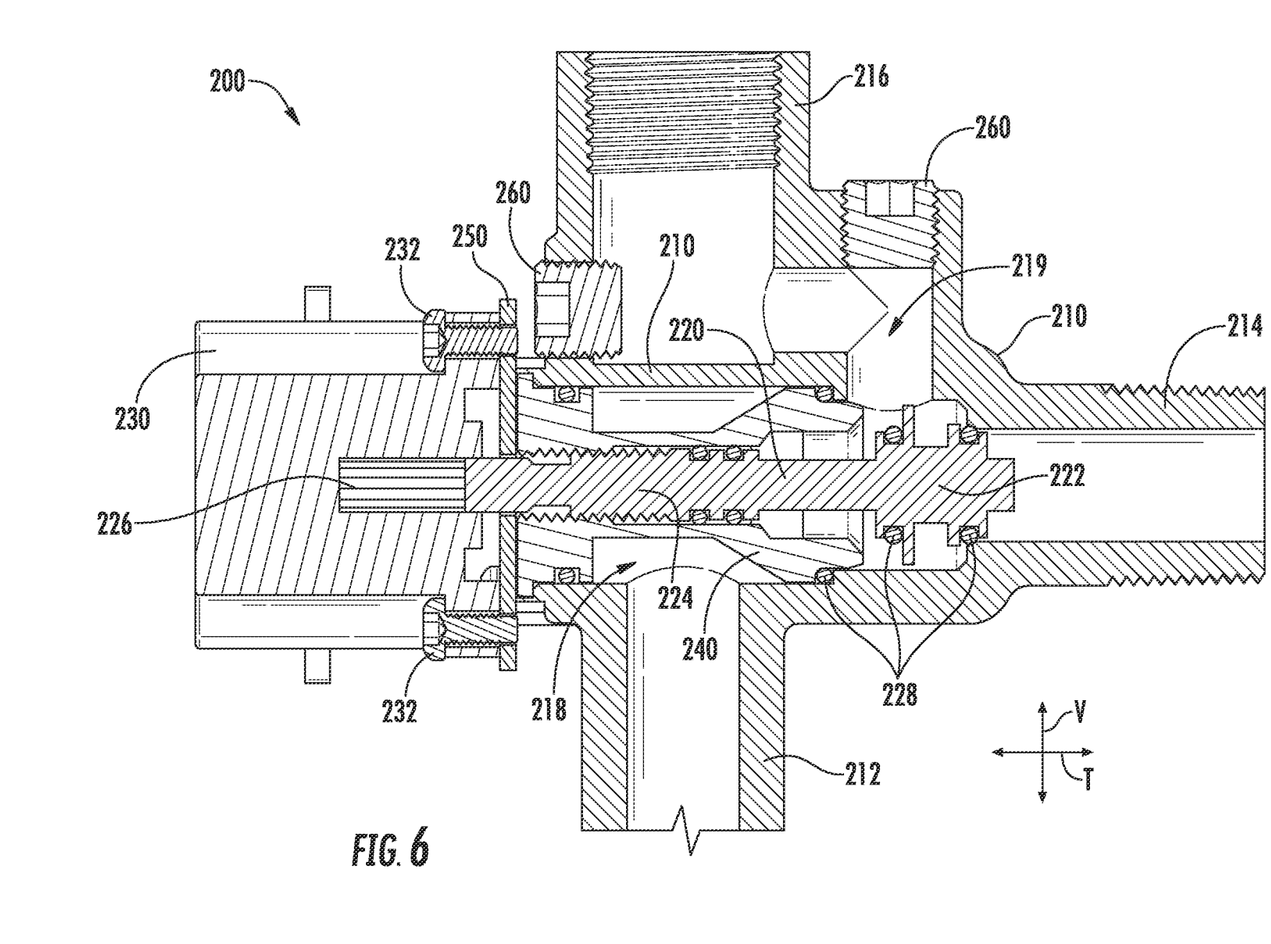
FIG. 6 provides a partial, section view of the mixing valve of FIG. 4 with the plunger of the mixing valve in a fully closed position.

FIG. 5 provides a partial, section view of mixing valve 200 with plunger 220 in a fully open position. FIG. 6 provides a partial, section view of mixing valve 200 with plunger 220 in a fully closed position. As may be seen in FIG. 5, head 222 of plunger 220 is positioned, e.g., within mixing chamber 218 of valve body 210, such that head 222 of plunger 220 blocks or significantly limits fluid flow from hot water conduit 212 of valve body 210 into mixing chamber 218 of valve body 210 when plunger 220 is in the fully open position. Thus, all or most of water exiting mixing chamber 218 and flowing to mixed water conduit 216 of valve body 210 is from cold water conduit 214, and water within mixed water conduit 216 of valve body 210 is at or about the temperature of water within cold water conduit 214 when plunger 220 is in the fully open position. Conversely, as may be seen in FIG. 6, head 222 of plunger 220 is positioned, e.g., within mixing chamber 218 of valve body 210, such that head 222 of plunger 220 blocks or significantly limits fluid flow from cold water conduit 214 of valve body 210 into mixing chamber 218 of valve body 210 when plunger 220 is in the fully closed position. Thus, all or most of water exiting mixing chamber 218 and flowing to mixed water conduit 216 of valve body 210 is from hot water conduit 212 and water within mixed water conduit 216 of valve body 210 is at or about the temperature of water within hot water conduit 212 when plunger 220 is in the fully closed position.

Motor 230 may adjust plunger 220 between the open and closed positions. In addition, motor 230 may adjust plunger 220 to any suitable position between the open and closed positions. In such a manner, motor 230 may adjust the temperature of water exiting mixing valve 200 at mixed water conduit 216 of valve body 210 to any suitable temperature between the temperature of water within cold water conduit 214 and the temperature of water within hot water conduit 212.

As may be seen in FIGS. 5 and 6, mixing valve 200 also includes various seals 228. Certain seals of seals 228 extend between support bracket 240 and valve body 210 in order to limit leakage of water from mixing chamber 218 of valve body 210. In addition, other seals of seals 228 extend between plunger 220 and valve body 210 in order to assist with limiting leakage of water around the head 222 of plunger 220, e.g., when plunger 220 is in the open and closed positions. Mixing valve 200 further includes plugs 260 mounted to valve body 210, e.g., that seal openings used to form or machine supply conduit 219 within valve body 210. Mixing conduit temperature sensor 170 may also be mounted to valve body 210, e.g., at mixed water conduit 216, as shown in FIG. 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump water heater appliance, comprising:
a casing;
a tank disposed within the casing, the tank defining an inlet and an outlet;
an inlet conduit mounted to the tank at the inlet of the tank;
a bypass conduit coupled to the inlet conduit;
a sealed system configured for heating water within the tank, the sealed system having a condenser positioned at the tank, a compressor operable to provide compressed refrigerant to the condenser and an evaporator configured for receiving refrigerant from the condenser; and
an electronic mixing valve positioned within the casing at the outlet of the tank, the electronic mixing valve comprising:
a valve body that defines a heated water conduit, a cold water conduit, a mixed water conduit and a mixing chamber, the valve body coupled to the tank such that the heated water conduit is positioned for receiving heated water from the outlet of the tank, the bypass conduit coupled to the valve body at the cold water conduit of the valve body, the heated water conduit and the mixed water conduit positioned coaxially with each other and extending along a vertical direction within the casing, the cold water conduit extending along a transverse direction such that the cold water conduit is orthogonal to the heated water conduit and the mixed water conduit;
a plunger positioned within the valve body at the mixing chamber of the valve body, the plunger having a head, the plunger being positioned coaxially with the cold water conduit; and
a motor coupled to the plunger, the motor operable to adjust a position of the head of the plunger within the valve body.

2. The heat pump water heater appliance of claim 1, wherein the heated water conduit, the cold water conduit and the mixed water conduit of the valve body are integrally formed with one another.

3. The heat pump water heater appliance of claim 2, wherein the valve body defines a supply conduit that extends between the mixing chamber and the mixed water conduit of the valve body, the supply conduit integrally formed with the mixed water conduit of the valve body.

4. The heat pump water heater appliance of claim 1, wherein the electronic mixing valve further comprises a support bracket positioned within the mixing chamber of the valve body, a post of the plunger threaded to the support bracket.

5. The heat pump water heater appliance of claim 4, wherein the electronic mixing valve further comprises a mounting plate coupled to the valve body, the mounting plate contacting the support bracket such that the mounting plate retains the support bracket within the mixing chamber of the valve body.

6. The heat pump water heater appliance of claim 5, wherein the motor is positioned on the mounting plate.

7. The heat pump water heater appliance of claim 1, wherein the heated water conduit is positioned directly below the mixed water conduit of the valve body within the casing.

8. The heat pump water heater appliance of claim 1, wherein the mixed water conduit of the valve body is oriented such that liquid within the mixed water conduit flows along the vertical direction, the motor configured for moving the plunger along the transverse direction.

9. The heat pump water heater appliance of claim 1, wherein the compressor and evaporator of the sealed system and the electronic mixing valve are positioned within the casing above the tank.

10. A heat pump water heater appliance, comprising:
a casing;
a tank disposed within the casing, the tank defining an inlet and an outlet;
an inlet conduit mounted to the tank at the inlet of the tank;
a bypass conduit coupled to the inlet conduit;
a sealed system configured for heating water within the tank, the sealed system having a condenser positioned at the tank, a compressor operable to provide compressed refrigerant to the condenser and an evaporator configured for receiving refrigerant from the condenser; and
an electronic mixing valve positioned within the casing at the outlet of the tank, the electronic mixing valve comprising:
a valve body having a heated water conduit, a cold water conduit, a mixed water conduit and a mixing chamber, the heated water conduit coupled to the tank at the outlet of the tank, the bypass conduit coupled to the cold water conduit, the mixed water conduit positioned above the heated water conduit, the cold water conduit oriented such that the cold water conduit extends along a transverse direction such that the cold water conduit is orthogonal to the heated water conduit and the mixed water conduit that extend along a vertical direction within the casing;

a plunger positioned within the valve body at the mixing chamber of the valve body, the plunger having a head, the plunger extending coaxial to the cold water conduit; and a motor coupled to the plunger, the motor operable to adjust a position of the head of the plunger within the valve body.

11. The heat pump water heater appliance of claim 10, wherein the heated water conduit, the cold water conduit and the mixed water conduit of the valve body are integrally formed with one another.

12. The heat pump water heater appliance of claim 11, wherein the valve body defines a supply conduit that extends between the mixing chamber and the mixed water conduit of the valve body, the supply conduit integrally formed with the mixed water conduit of the valve body.

13. The heat pump water heater appliance of claim 10, wherein the electronic mixing valve further comprises a support bracket positioned within the mixing chamber of the valve body, a post of the plunger threaded to the support bracket.

14. The heat pump water heater appliance of claim 13, wherein the electronic mixing valve further comprises a mounting plate coupled to the valve body, the mounting plate contacting the support bracket such that the mounting plate retains the support bracket within the mixing chamber of the valve body.

15. The heat pump water heater appliance of claim 14, wherein the motor is positioned on the mounting plate.

16. The heat pump water heater appliance of claim 10, wherein the heated water conduit is threaded to the tank at the outlet of the tank.

17. The heat pump water heater appliance of claim 10, wherein the mixed water conduit of the valve body is oriented such that liquid within the mixed water conduit flows along the vertical direction, the motor configured for moving the plunger along the transverse direction.

18. An electronic mixing valve for a water heater appliance, comprising a valve body defining a heated water conduit, a cold water conduit, a mixed water conduit and a mixing chamber, the heated water conduit and the mixed water conduit positioned coaxially with each other and extending along a vertical direction, the cold water conduit oriented such that the cold water conduit extends along a transverse direction such that the cold water conduit is orthogonal to the heated water conduit and the mixed water conduit, the heated water conduit, the cold water conduit and the mixed water conduit of the valve body integrally formed with one another;

a plunger positioned within the valve body at the mixing chamber of the valve body, the plunger having a head, the plunger being positioned coaxially with the cold water conduit; and a motor coupled to the plunger, the motor operable to adjust a position of the head of the plunger within the valve body.

\* \* \* \* \*